(12) United States Patent
Singer et al.

(10) Patent No.: US 8,271,152 B2
(45) Date of Patent: Sep. 18, 2012

(54) SYSTEM AND METHOD FOR RENDERING AN ONBOARD AIRCRAFT DISPLAY FOR USE WITH IN-TRAIL PROCEDURES

(75) Inventors: Donald Singer, Peoria, AZ (US); Patrick Mulhall, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 104 days.

(21) Appl. No.: 12/721,146

(22) Filed: Mar. 10, 2010

(65) Prior Publication Data
US 2011/0224847 A1    Sep. 15, 2011

(51) Int. Cl.
*G01C 23/00*    (2006.01)
(52) U.S. Cl. ............................. 701/4; 701/300
(58) Field of Classification Search ............... 701/3–5, 701/16–18, 120–122, 300–302; 340/961, 340/971
See application file for complete search history.

(56) References Cited

U.S. PATENT DOCUMENTS

| | | | |
|---|---|---|---|
| 3,875,379 A | 4/1975 | Vietor | |
| 5,077,673 A | 12/1991 | Brodegard et al. | |
| 5,574,647 A | 11/1996 | Liden | |
| 5,957,412 A * | 9/1999 | Saint Upery et al. | 244/180 |
| 6,148,259 A | 11/2000 | Hagelauer | |
| 6,433,729 B1 | 8/2002 | Staggs | |
| 6,690,298 B1 | 2/2004 | Barber et al. | |
| 6,720,891 B2 | 4/2004 | Chen et al. | |
| 6,799,114 B2 | 9/2004 | Etnyre | |
| 6,839,018 B2 | 1/2005 | Szeto et al. | |
| 6,876,906 B1 | 4/2005 | Zellers et al. | |
| 6,963,291 B2 | 11/2005 | Holforty et al. | |
| 7,366,591 B2 * | 4/2008 | Hartmann et al. | 701/4 |
| 7,367,526 B2 | 5/2008 | Baudry | |

(Continued)

FOREIGN PATENT DOCUMENTS
EP     1752739 A2    2/2007
(Continued)

OTHER PUBLICATIONS

Chartrand, R.C., et al.; Operational Improvements From Using the In-Trail Procedure in the North Atlantic Organized Track System, NASA/TM-2009-215939, Oct. 2009.

(Continued)

*Primary Examiner* — Khoi Tran
*Assistant Examiner* — Jason Holloway
(74) *Attorney, Agent, or Firm* — Ingrassia Fisher & Lorenz, P.C.

(57) ABSTRACT

A system and method for displaying aircraft traffic information on an onboard display element of a host aircraft are provided. The system obtains current flight status data of the host aircraft and current flight status data of a second aircraft that is near the host aircraft, and processes the current flight status data of the host aircraft and the current flight status data of the second aircraft to determine an in-trail procedure (ITP) opportunity region for the host aircraft. The ITP opportunity region is associated with conditions that satisfy ITP criteria for the host aircraft. The system renders, on the onboard display element, an ITP display comprising graphical representations of the host aircraft and the second aircraft positioned in accordance with the current flight status data of the host aircraft and the current flight status data of the second aircraft. The ITP display further includes a graphical representation of the ITP opportunity region.

16 Claims, 6 Drawing Sheets

U.S. PATENT DOCUMENTS

| | | | |
|---|---|---|---|
| 7,375,678 B2 | 5/2008 | Feyereisen et al. | |
| 7,386,373 B1 | 6/2008 | Chen et al. | |
| 7,403,843 B2 | 7/2008 | Gremmert | |
| 7,453,375 B2 | 11/2008 | Chamas et al. | |
| 7,570,178 B1* | 8/2009 | Whalen et al. | 340/961 |
| 7,650,232 B1 | 1/2010 | Paielli | |
| 7,746,343 B1 | 6/2010 | Charaniya et al. | |
| 7,747,382 B2 | 6/2010 | Small et al. | |
| 7,877,197 B2 | 1/2011 | Lewis et al. | |
| 7,961,135 B2 | 6/2011 | Smith et al. | |
| 7,965,223 B1 | 6/2011 | McCusker | |
| 2002/0075171 A1* | 6/2002 | Kuntman et al. | 340/961 |
| 2002/0089432 A1* | 7/2002 | Staggs et al. | 340/945 |
| 2002/0133294 A1* | 9/2002 | Farmakis et al. | 701/301 |
| 2006/0290562 A1 | 12/2006 | Ehresman | |
| 2008/0309518 A1 | 12/2008 | Aung | |
| 2009/0024311 A1 | 1/2009 | Hess | |
| 2009/0088972 A1 | 4/2009 | Bushnell | |
| 2009/0231163 A1 | 9/2009 | He | |
| 2009/0267800 A1 | 10/2009 | Hammack et al. | |
| 2010/0023187 A1 | 1/2010 | Gannon et al. | |
| 2010/0070180 A1 | 3/2010 | Ridenour | |
| 2010/0131121 A1 | 5/2010 | Gerlock | |
| 2010/0152932 A1 | 6/2010 | Das | |
| 2010/0286900 A1 | 11/2010 | Depape et al. | |
| 2010/0292871 A1 | 11/2010 | Schultz et al. | |
| 2010/0305783 A1* | 12/2010 | Tucker et al. | 701/4 |
| 2010/0332054 A1 | 12/2010 | Brandao et al. | |
| 2011/0006918 A1 | 1/2011 | Shafaat et al. | |
| 2011/0066360 A1 | 3/2011 | Haissig | |
| 2011/0066362 A1 | 3/2011 | He | |
| 2011/0118981 A1 | 5/2011 | Chamlou | |
| 2011/0187588 A1 | 8/2011 | Khatwa et al. | |
| 2011/0224847 A1 | 9/2011 | Singer et al. | |
| 2011/0231096 A1 | 9/2011 | Ridenour, II | |
| 2011/0270472 A1 | 11/2011 | Shafaat et al. | |
| 2011/0270473 A1 | 11/2011 | Reynolds et al. | |
| 2011/0276198 A1 | 11/2011 | Khatwa et al. | |
| 2011/0282568 A1 | 11/2011 | Khatwa et al. | |
| 2011/0316857 A1 | 12/2011 | Pepitone et al. | |

FOREIGN PATENT DOCUMENTS

| | | |
|---|---|---|
| EP | 1752739 A3 | 1/2008 |
| EP | 2345872 A2 | 7/2011 |

OTHER PUBLICATIONS

EP Search Report, EP11 154 857.4, dated Apr. 11, 2012.

USPTO Office Action for U.S. Appl. No. 12/774,513; Notification date May 2, 2012.

Federal Aviation Administration; NextGen Operator and Airport Enablers; Supplement to NextGen Investment for Operators and Airport, FAA's NextGen Implementation Plan, Mar. 2011.

Koeners, J.; deVries, M.; Delft University of Technology, Delft, The Netherlands; Conflict Resolution Support for Air Traffic Control Based on Solution Spaces: Design and Implementation; 2008 IEEE.

Murdoch, J. L. et al.; Enchanced Oceanic Operations Human-In-The-Loop In-Trail Procedure Validation Simulation Study, NASA/TP-2008-215313, Jun. 2008.

Jones, K.M.; ADS-B In-Trail Procedures, Overview of Research Results; National Aeronautics and Space Administration; Presented to the ASAS TN2 Workshop, Sep. 2007.

EP Examination Report for EP 11 154 857.4, dated May 22, 2012.

* cited by examiner

SYSTEM AND METHOD FOR RENDERING AN ONBOARD AIRCRAFT DISPLAY FOR USE WITH IN-TRAIL PROCEDURES

TECHNICAL FIELD

Embodiments of the subject matter described herein relate generally to avionics systems such as flight display systems. More particularly, embodiments of the subject matter relate to an in-trail procedure display for a host aircraft.

BACKGROUND

The in-trail procedure (ITP) is a protocol followed by an aircraft that desires to change its current flight level to a new flight level by descending or climbing in front of or behind one or more potentially blocking aircraft that are flying at an intervening flight level. In accordance with the ITP, certain conditions must be satisfied before the flight crew member issues a request for clearance to proceed with the flight level change. Whether or not the conditions are satisfied will depend on a number of dynamically changing factors associated with the host aircraft and other aircraft, such as the current geographic position of the aircraft, the current speed of the aircraft, the current heading of the aircraft, the desired new flight level, and the current flight level.

Modern flight deck instrumentation might include a vertical situation display (VSD) that provides a two-dimensional representation of an aircraft, the aircraft vertical flight plan, and neighboring aircraft. VSDs typically include a number of parameters and visual indicators that enable the pilot to form a quick mental picture of the vertical situation of the host aircraft. For example, VSDs may include displays of an aircraft symbol, the aircraft altitude, the vertical flight plan, and terrain. Thus, a member of the aircraft flight crew can obtain information related to the vertical situation of the aircraft relative to the terrain with a simple glance at the VSD.

A VSD could be used to identify the vertical position of potentially blocking aircraft for purposes of the ITP. Even if a VSD is deployed, however, the flight crew member will still need to mentally interpret the traffic situation and/or perform manual calculations related to the designation of potentially blocking aircraft and related to the determination of whether the conditions exist requiring the ITP protocol be used for a desired flight level change.

BRIEF SUMMARY

A method for displaying aircraft traffic information on an onboard display element of a host aircraft is provided. The method obtains current flight status data of the host aircraft and current flight status data of a neighboring aircraft that is near the host aircraft, and processes the current flight status data of the host aircraft and the current flight status data of the neighboring aircraft to determine an in-trail procedure (ITP) opportunity region for the host aircraft. The ITP opportunity region is associated with conditions that satisfy ITP criteria for the host aircraft. The method continues by rendering, on the onboard display element, an ITP display comprising graphical representations of the host aircraft and the neighboring aircraft positioned in accordance with the current flight status data of the host aircraft and the current flight status data of the neighboring aircraft. The ITP display also includes a graphical representation of the ITP opportunity region.

Also provided is another method for displaying aircraft traffic information on an onboard display element of a host aircraft. This method receives, from a reference aircraft other than the host aircraft, current flight status data of the reference aircraft, and acquires a requested flight level that is different than a current flight level of the host aircraft. The method proceeds by determining an opportunity region for the host aircraft, the opportunity region being associated with conditions required to request a change in flight level from the current flight level of the host aircraft to the requested flight level, and the opportunity region being determined based on the current flight data of the reference aircraft, the requested flight level, the current flight level, and current flight data of the host aircraft. The method then displays a graphical representation of the opportunity region on the onboard display element.

A flight deck display system for a host aircraft is also provided. The system includes an aircraft-to-aircraft data communication module that receives current flight status data of a neighboring aircraft, and a processor coupled to the aircraft-to-aircraft data communication module. The processor obtains and process the current flight status data along with current host aircraft flight status data to determine an opportunity region for the host aircraft, where the opportunity region is associated with criteria that must be satisfied to request a change in flight level from a current flight level of the host aircraft to a new flight level. The processor generates image rendering display commands based upon the current flight status data, the current host aircraft flight status data, the current flight level, and the new flight level. The system also includes a display element coupled to the processor and configured to receive the image rendering display commands and, in response thereto, to render an in-trail procedure (ITP) display that includes graphical representations of the host aircraft, the neighboring aircraft, and the opportunity region.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
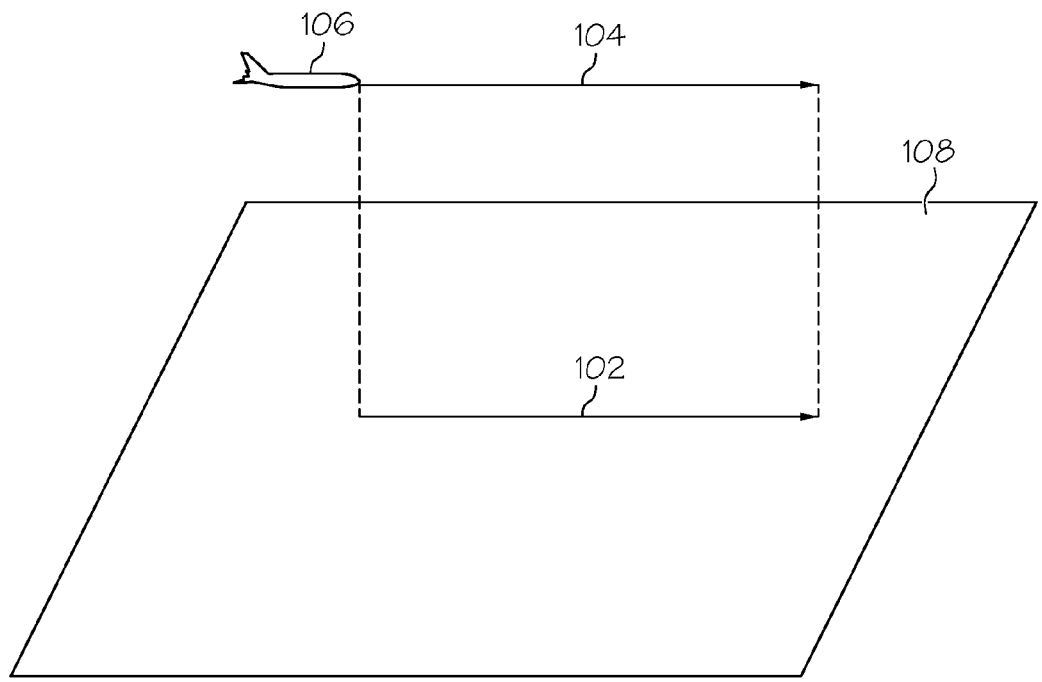
FIG. 1 is a diagram that illustrates the track associated with the flight path of an aircraft.

Although not always required, the techniques and technologies described here are suitable for use by aircraft using the ITP in an oceanic (or other) track system. For example, the techniques and technologies presented here could be used in connection with the ITP as defined and explained in *Operational Improvements From Using the In-Trail Procedure in the North Atlantic Organized Track System*, by Ryan C. Chartrand et al., National Aeronautics and Space Administration (October 2009) (hereinafter referred to as the "NASA Document"). For ease of understanding and clarity, the following description employs terminology that is consistent with that used in the NASA Document. Moreover, the relevant portions of the NASA Document are incorporated by reference herein. In this regard, FIG. 1 is a diagram that illustrates the track 102 associated with the flight path 104 of an aircraft 106. The track 102 represents a projection of the flight path 104 onto a flat plane 108, which may correspond to the ground. Accordingly, the track 102 will be the same whether the aircraft 106 maintains a fixed altitude, climbs, or descends while following the flight path 104.

Figure 2:
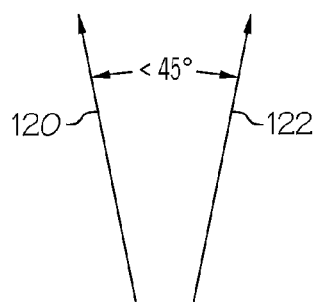
FIG. 2 is a diagram that illustrates the tracks associated with two different aircraft.
Figure 3:
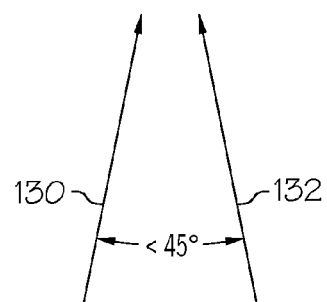
FIG. 3 is another diagram that illustrates the tracks associated with two different aircraft.

The NASA Document specifies that the host aircraft and any neighboring aircraft of interest (i.e., a potentially blocking aircraft) must be "same direction" aircraft in order for an ITP flight level change to be requested. In this regard, "same direction" tracks are intersecting tracks (or portions thereof) having an angular difference of less than 45 degrees. As an example, FIG. 2 is a diagram that illustrates the tracks 120 and 122 associated with two different aircraft. Even though the tracks 120/122 are divergent, they are considered to be in the same direction for purposes of the ITP because the angle between them is less than 45 degrees. As another example, FIG. 3 illustrates the tracks 130/132 associated with two different aircraft. Even though the tracks 130/132 are convergent, they are considered to be in the same direction for purposes of the ITP because the angle between them is less than 45 degrees.

The ITP is a protocol that can be followed when an aircraft seeks to change its flight level to a new flight level in the presence of a potentially blocking aircraft located at an intervening flight level. According to the NASA Document, the "ITP is intended to enable altitude changes that are otherwise blocked when aircraft are spaced at less than current separation standards at altitudes between the current and desired altitudes of a requesting aircraft." The ITP specifies some minimum separation between aircraft at the current and requested flight levels, to ensure safe altitude changes. Moreover, the ITP specifies certain criteria that must be satisfied before the host aircraft can issue a request for ITP flight level change (such requests are issued to Air Traffic Control (ATC)). Although different criteria could be utilized by an embodiment of the subject matter described here, the NASA Document indicates the following ITP initiation criteria, where at least one of two conditions must be met: (1) if the ITP distance to a reference aircraft is greater than or equal to 15 nautical miles, then the groundspeed differential between the two aircraft must be less than or equal to 20 knots; or (2) if the ITP distance to a reference aircraft is greater than or equal to 20 nautical miles, then the groundspeed differential between the two aircraft must be less than or equal to 30 knots.

Figure 4:
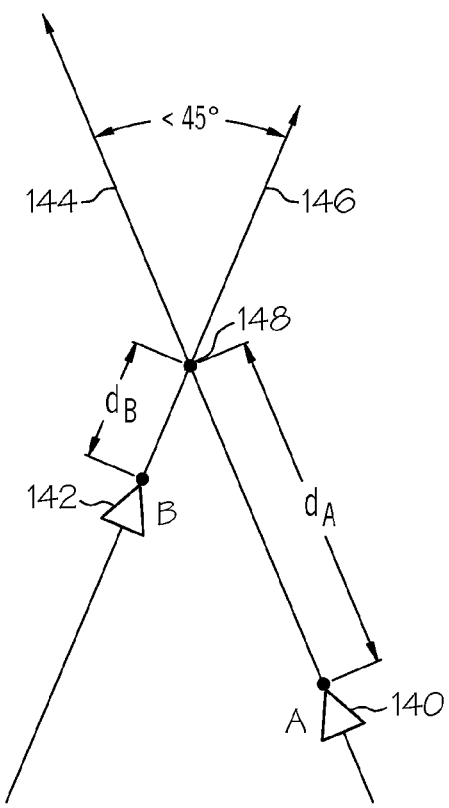
FIG. 4 is a diagram that illustrates the intersecting tracks associated with two different aircraft.

The ITP distance represents one appropriate measure of distance between the host aircraft and a nearby reference aircraft (a potentially blocking aircraft, which may be in front of or behind the host aircraft). Depending upon the particular embodiment, other distance metrics, distance measures, or relative spacing metrics could be used. For instance, the system could contemplate linear distance, time, aircraft acceleration, relative speed, closing rate, and/or other measurable or computable values that are dependent on the current geographic position, speed, acceleration, heading, attitude, or other operating status of the aircraft. The NASA Document defines the ITP distance as "the difference in distance to a common point along each aircraft's track." In this regard, FIG. 4 is a diagram that illustrates the intersecting tracks associated with two different aircraft. In FIG. 4, one aircraft 140 is labeled "A" and another aircraft 142 is labeled "B". The aircraft 140 has a corresponding track 144, and the aircraft 142 has a corresponding track 146 that intersects the track 144 at a point 148. Note that the aircraft 140/142 are considered to be in the same direction because the angle between the two tracks 144/146 is less than 45 degrees. In FIG. 4, the label "$d_A$" identifies the current distance between the aircraft 140 and the point 148, and the label "$d_B$" identifies the current distance between the aircraft 142 and the point 148. For this example, the ITP distance ($d_{ITP}$) is defined by the following expression: $d_{ITP}=|d_A-d_B|$.

Figure 5:
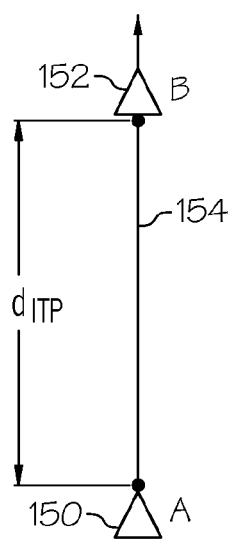
FIG. 5 is a diagram that illustrates the overlapping tracks associated with two different aircraft.

As another example, FIG. 5 is a diagram that illustrates the overlapping tracks associated with two different aircraft. In FIG. 5, one aircraft 150 is labeled "A" and another aircraft 152 is labeled "B". In this scenario, the two aircraft have a common or overlapping track 154. Consequently, the current distance between the two aircraft is also considered to be the ITP distance under these conditions. In FIG. 5, the label "$d_{ITP}$" indicates the current ITP distance between the aircraft 150 and the aircraft 152.

The system and methods presented here can be utilized to generate a flight deck display that includes a graphical indication of whether or not the ITP criteria is satisfied for the current flight conditions. In certain embodiments, the ITP display is similar in format to a typical vertical situation display (VSD) in that the host aircraft and neighboring aircraft are graphically represented in an elevation view using a vertical altitude scale. The ITP display includes a time/position region (also referred to here as an opportunity region or zone) where the ITP criteria is satisfied. In certain embodiments, the opportunity region is rendered as a highlighted color band at the current flight level of the host aircraft, and such that the ITP criteria is satisfied when the host aircraft and the highlighted opportunity region coincide. Data retrieval and processing for the computation of the opportunity region can be semi-automatic or fully automatic. In the semi-automatic mode, the pilot can select the desired flight level and reference traffic, and the system will compute and display the future time and location where the ITP criteria will be met, thus allowing the pilot to request and execute the ITP maneuver while the graphical representation of the host aircraft is displayed within the opportunity region. In the fully automatic mode, the system may be coupled to a flight management system function and/or a traffic computer that calculates when and to what flight level the host aircraft should climb (or descend), and then selects the appropriate reference aircraft for the maneuver. Moreover, multiple opportunity regions may be concurrently rendered on the ITP display, relative to multiple reference aircraft and performance criteria.

Figure 6:
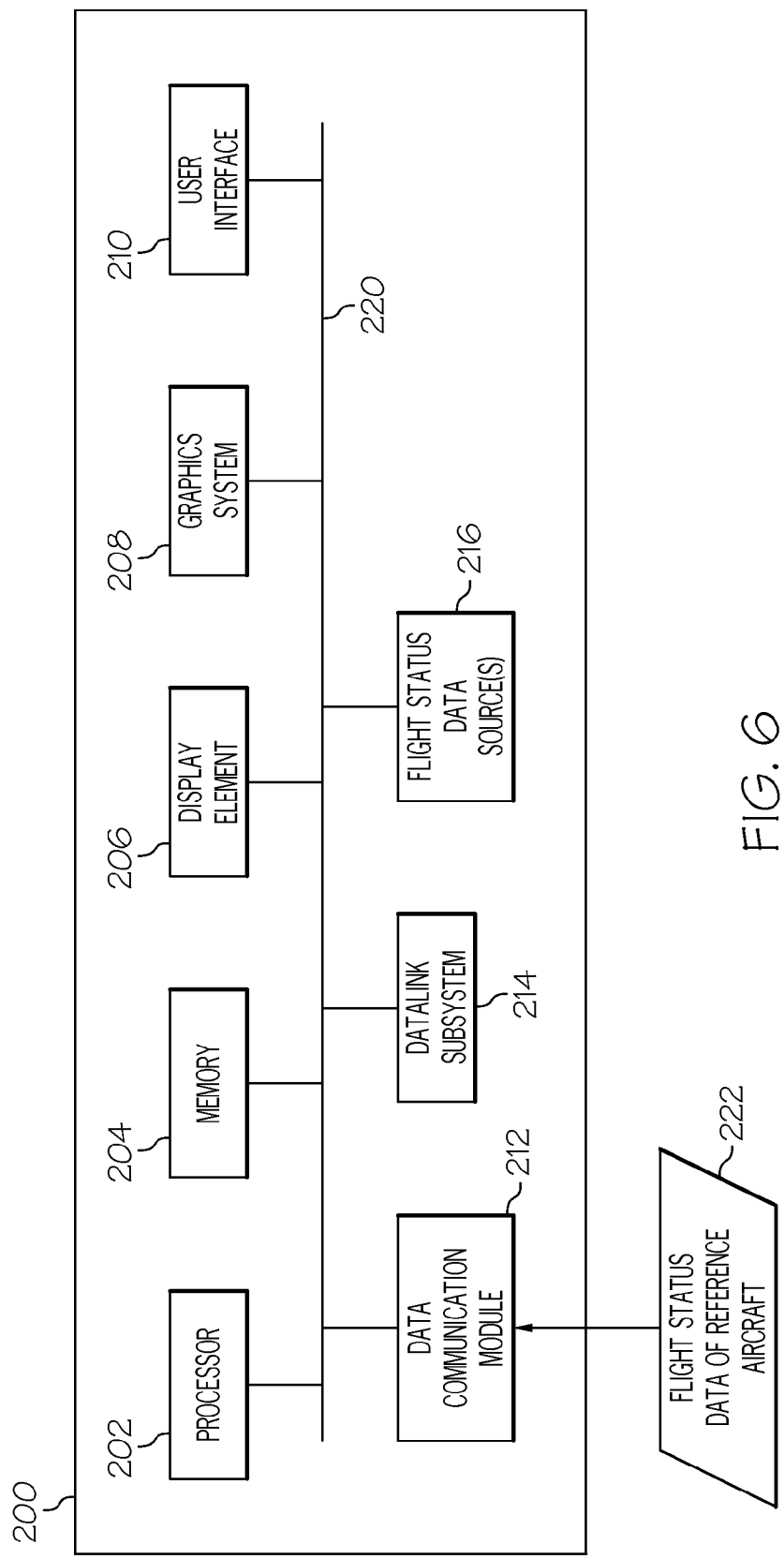
FIG. 6 is a schematic representation of an exemplary embodiment of a flight deck display system.

An ITP display can be generated using a suitably configured onboard system, such as a flight deck display system. In this regard, FIG. 6 is a schematic representation of an exemplary embodiment of a flight deck display system 200 that is suitable for use with a vehicle such as an aircraft. In exemplary embodiments, the display system 200 is located onboard the host aircraft, i.e., the various components and elements of the display system 200 reside within the host aircraft, are carried by the host aircraft, or are attached to the host aircraft. The illustrated embodiment of the display system 200 includes, without limitation: at least one processor 202; an appropriate amount of memory 204; a display element 206; a graphics system 208; a user interface 210; a data communication module 212; a datalink subsystem 214; and at least one source of flight status data 216. These elements of the display system 200 may be coupled together by a suitable interconnection architecture 220 that accommodates data communication, the transmission of control or command signals, and/or the delivery of operating power within the display system 200. It should be understood that FIG. 6 is a simplified representation of the display system 200 that will be used for purposes of explanation and ease of description, and that FIG. 6 is not intended to limit the application or scope of the subject matter in any way. In practice, the display system 200 and the host aircraft will include other devices and components for providing additional functions and features, as will be appreciated in the art. Furthermore, although FIG. 6 depicts the display system 200 as a single unit, the individual elements and components of the display system 200 could be implemented in a distributed manner using any number of physically distinct pieces of hardware or equipment.

The processor 202 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor 202 obtains and processes current flight status data (of the host aircraft and one or more reference aircraft) to determine the ITP opportunity region for the host aircraft, and to control the rendering of the ITP display in an appropriate manner.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC. In practice, a functional or logical module/component of the display system 200 might be realized using program code that is maintained in the memory 204. For example, the graphics system 208, the data communication module 212, or the datalink subsystem 214 may have associated software program components that are stored in the memory 204. Moreover, the memory 204 can be used to store data utilized to support the operation of the display system 200, as will become apparent from the following description.

In an exemplary embodiment, the display element 206 is coupled to the graphics system 208. The graphics system 208 is coupled to the processor 202 such that the processor 202 and the graphics system 208 cooperate to display, render, or otherwise convey one or more graphical representations, synthetic displays, graphical icons, visual symbology, or images associated with operation of the host aircraft on the display element 206, as described in greater detail below. An embodiment of the display system 200 may utilize existing graphics processing techniques and technologies in conjunction with the graphics system 208. For example, the graphics system 208 may be suitably configured to support well known graphics technologies such as, without limitation, VGA, SVGA, UVGA, or the like.

In an exemplary embodiment, the display element 206 is realized as an electronic display configured to graphically display flight information or other data associated with operation of the host aircraft under control of the graphics system 208. In practice, the processor 202 and/or the graphics system 208 produces image rendering display commands that are received by the display element 206 for purposes of rendering the ITP display. The display element 206 is usually located within a cockpit of the host aircraft. It will be appreciated that although FIG. 6 shows a single display element 206, in practice, additional display devices may be present onboard the host aircraft.

The illustrated embodiment of the display system 200 includes a user interface 210, which is suitably configured to receive input from a user (e.g., a pilot) and, in response to the user input, supply appropriate command signals to the processor 202. The user interface 210 may be any one, or any combination, of various known user interface devices or technologies, including, but not limited to: a cursor control device such as a mouse, a trackball, or joystick; a keyboard; buttons; switches; or knobs. Moreover, the user interface 210 may cooperate with the display element 206 and the graphics system 208 to provide a graphical user interface. Thus, a user can manipulate the user interface 210 by moving a cursor symbol rendered on the display element 206, and the user may use a keyboard to, among other things, input textual data. For example, the user could manipulate the user interface 210 to enter a desired or requested new flight level into the display system 200.

In an exemplary embodiment, the data communication module 212 is suitably configured to support data communication between the host aircraft and one or more remote systems. More specifically, the data communication module 212 is used to receive current flight status data 222 of other aircraft that are near the host aircraft. In particular embodiments, the data communication module 212 is implemented as an aircraft-to-aircraft data communication module that receives flight status data from an aircraft other than the host aircraft. For example, the data communication module 212 may be configured for compatibility with Automatic Dependant Surveillance-Broadcast (ADS-B) technology, with Traffic and Collision Avoidance System (TCAS) technology, and/or with similar technologies.

The flight status data 222 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 200 is suitably designed to process the flight status data 222 in the manner described in more detail herein. In particular, the display system 200 can use the flight status data 222 when rendering the ITP display.

The datalink subsystem 214 enables the host aircraft to communicate with Air Traffic Control (ATC). In this regard, the datalink subsystem 214 may be used to provide ATC data to the host aircraft and/or to send information from the host aircraft to ATC, preferably in compliance with known standards and specifications. Using the datalink subsystem 214, the host aircraft can send ITP requests to ground based ATC stations and equipment. In turn, the host aircraft can receive ITP clearance or authorization from ATC (when appropriate) such that the pilot can initiate the requested flight level change.

In operation, the display system 200 is also configured to process the current flight status data for the host aircraft. In this regard, the sources of flight status data 216 generate, measure, and/or provide different types of data related to the operational status of the host aircraft, the environment in which the host aircraft is operating, flight parameters, and the like. In practice, the sources of flight status data 216 may be realized using line replaceable units (LRUs), transducers, accelerometers, instruments, sensors, and other well known devices. The data provided by the sources of flight status data 216 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 200 is suitably designed to process data obtained from the sources of flight status data 216 in the manner described in more detail herein. In particular, the display system 200 can use the flight status data of the host aircraft when rendering the ITP display.

Figure 7:
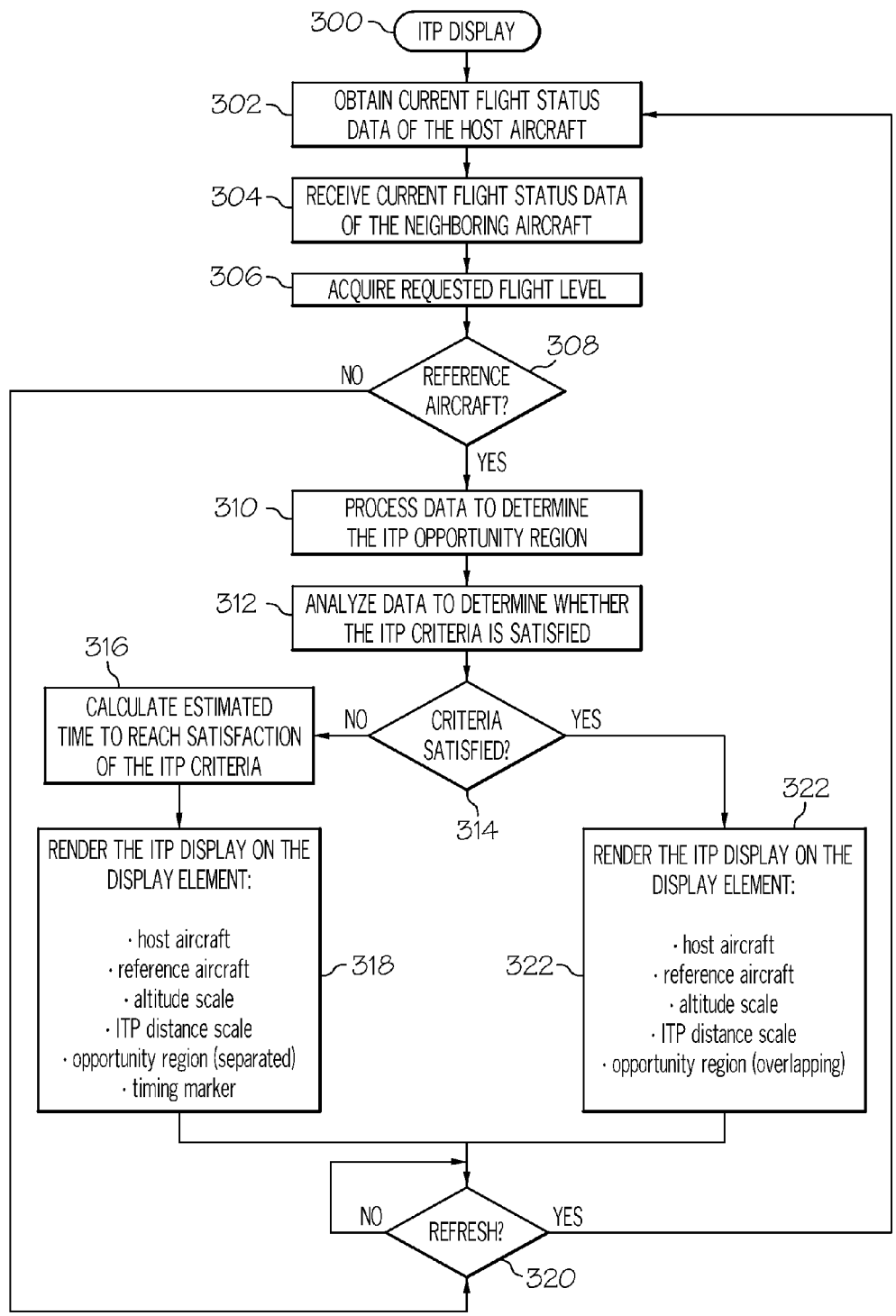
FIG. 7 is a flow chart that illustrates an exemplary embodiment of an ITP display process.

FIG. 7 is a flow chart that illustrates an exemplary embodiment of an ITP display process 300 suitable for use with a flight deck display system such as the display system 200. Process 300 represents one implementation of a method for displaying aircraft traffic information (in the form of an ITP display) on an onboard display element of a host aircraft. The various tasks performed in connection with process 300 may be performed by software, hardware, firmware, or any combination thereof. For illustrative purposes, the following description of process 300 may refer to elements mentioned above in connection with FIG. 6. In practice, portions of process 300 may be performed by different elements of the described system, e.g., a processor, a display element, or a data communication component. It should be appreciated that process 300 may include any number of additional or alternative tasks, the tasks shown in FIG. 7 need not be performed in the illustrated order, and process 300 may be incorporated into a more comprehensive procedure or process having additional functionality not described in detail herein. Moreover, one or more of the tasks shown in FIG. 7 could be omitted from an embodiment of the process 300 as long as the intended overall functionality remains intact.

In practice, process 300 can be performed in a virtually continuous manner at a relatively high refresh rate. For example, an iteration of process 300 could be performed once every two seconds (or less) such that the ITP display will be updated in real-time or substantially real time in a dynamic manner. This particular embodiment of process 300 begins by obtaining the current flight status data of the host aircraft (task 302). Process 300 also receives or otherwise obtains the current flight status data of one or more other aircraft near the host aircraft (task 304). In preferred embodiments, task 304 is performed using an appropriate aircraft-to-aircraft data communication technology and related subsystem components located onboard the host aircraft. This enables the host aircraft to receive the current flight status data of the other aircraft directly from the other aircraft.

Process 300 may be performed in connection with an ITP routine, during which the pilot or other flight crew member desires to change the altitude (flight level) of the host aircraft. Accordingly, process 300 may acquire a requested or desired new flight level that is different than the current flight level of the host aircraft (task 306). Task 306 may be associated with user manipulation of a user interface element, e.g., manual entry of the new flight level. The current flight status data of the host and other aircraft may then be processed in an appropriate manner to determine whether or not the neighboring aircraft should be treated as a reference aircraft for purposes of the ITP (query task 308). For this example, process 300 will classify at most two neighboring aircraft as "reference aircraft". One reference aircraft will be the closest neighboring aircraft that is in front of the host aircraft, while the other reference aircraft will be the closest neighboring aircraft that is behind the host aircraft. In certain embodiments, "reference aircraft" may be further defined with more specific criteria. For example, the NASA Document clarifies that a reference aircraft is a same direction and potentially blocking aircraft, relative to the host aircraft.

If process 300 determines that the neighboring aircraft of interest is not a reference aircraft (as defined by the system), then process 300 may exit or be re-entered at an appropriate point. For this embodiment, query task 308 leads to a task 320 if the neighboring aircraft of interest is not a reference aircraft. If the neighboring aircraft of interest is a reference aircraft, then process 300 may continue by processing data to determine the ITP opportunity region for the host aircraft (task 310). The processed data may include, without limitation: the current flight status data of the host aircraft; the current flight status data of the reference aircraft (one or two reference aircraft); the current flight level of the host aircraft; the current flight level of the reference aircraft; and the requested new flight level. Thus, the opportunity region can be influenced by or determined based on some or all of this data. For example, the opportunity region could be determined based on a measure of distance (e.g., the ITP distance) between the host aircraft and the reference aircraft and/or the groundspeed differential between the host aircraft and the reference aircraft. In accordance with certain embodiments that follow the example set forth in the NASA Document, the opportunity region is calculated in an appropriate manner such that it is associated with conditions that satisfy the stated ITP criteria for the host aircraft. More specifically, the opportunity region will be associated with conditions that are required in order to request a change in flight level from the current flight level of the host aircraft to the requested flight level.

The process 300 may also analyze the current flight status data of the host aircraft, the current flight status data of the reference aircraft, and possibly other data to determine whether the stated conditions (e.g., the defined ITP criteria) are satisfied (task 312). If the conditions or criteria have not been satisfied (query task 314), then the process 300 will render a graphical representation of the opportunity region in an appropriate manner. In certain embodiments, the process 300 calculates an estimated time to reach a state at which the stated conditions or criteria will be satisfied (task 316). For this example, task 316 calculates an estimated time to reach ITP criteria satisfaction for the host aircraft. The estimated time could be calculated from the current flight status data of the host aircraft, the current flight status data of the reference aircraft, and possibly other data available to the system. The estimated time can be used for various purposes, such as the rendering of a graphical time bar or other indicator (described below).

The process 300 continues by generating and rendering an appropriate ITP display on an onboard display element of the host aircraft (task 318). The ITP display will include a number of graphical features, visual elements, and graphical representations that are intended for viewing by the pilot and/or other flight crew members. For example, the ITP display might include, without limitation, graphical representations of: the host aircraft; the reference aircraft; neighboring aircraft; an altitude or flight level scale; a lateral distance scale; the opportunity region; and a timing marker. Notably, certain graphical characteristics of the ITP display will be determined by or otherwise influenced by the current flight status data of the host aircraft, the current flight status data of neighboring aircraft, and/or the current flight status data of reference aircraft.

Figure 8:
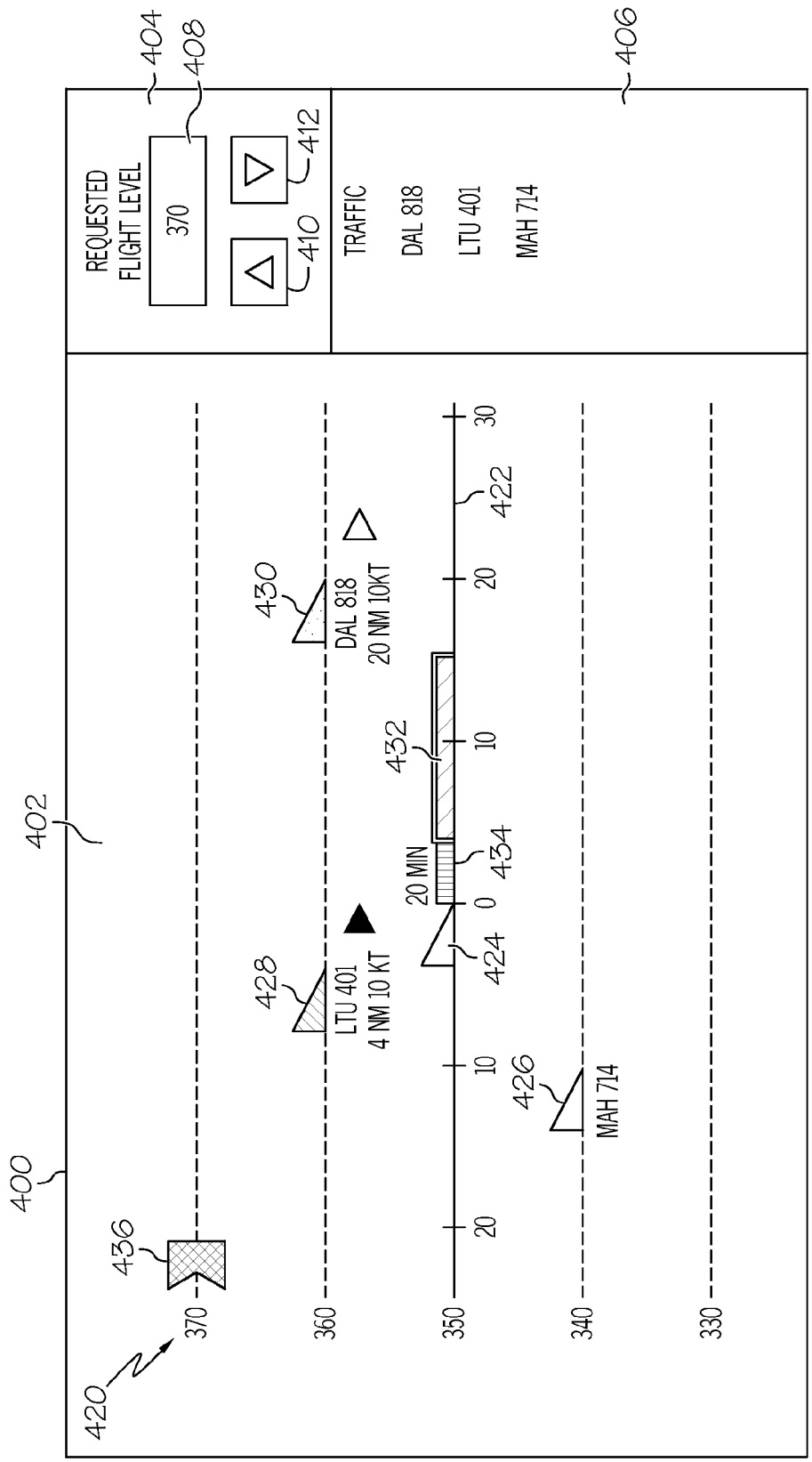
FIGS. 8 and 9 are schematic representations of an exemplary ITP display screens.

FIG. 8 is a schematic representation of an exemplary ITP display screen 400 that might be generated during an iteration of task 318. The ITP display screen 400 represents a snapshot of a dynamic display taken at a particular moment in time. This exemplary ITP display screen 400 generally includes a main display area 402, a data entry area 404, and a traffic status area 406. The main display area 402 contains most of the ITP-related information. The data entry area 404 includes a flight level field 408 in which the user can enter the desired new flight level (in this example, the flight level field 408 indicates a requested flight level of 37,000 feet). The data entry area 404 may also include a first user-selectable adjustment button 410 and a second user-selectable adjustment button 412. These adjustment buttons can be activated by the user as a means to adjust the desired flight level (as described in more detail below). The traffic status area 406 is utilized to list the other aircraft that appear in the main display area 402, using any appropriate identifier or nomenclature. This example identifies the other aircraft by carrier and tail number (DAL 818, LTU 401, and MAH 714).

The illustrated embodiment of the main display area 402 of the ITP display screen 400 generally includes, without limitation, graphical representations of the following items: an altitude scale 420 for the host aircraft and the other aircraft; a lateral distance scale 422 for the host aircraft and the other aircraft, which may be expressed in ITP distance using nautical miles as the unit of measurement; the host aircraft 424; a non-reference neighboring aircraft 426 (identified by the label MAH 714); a reference aircraft 428 (identified by the label LTU 401); another reference aircraft 430 (identified by the label DAL 818); an opportunity region 432; a timing marker 434; and a requested flight level marker 436, which visually indicates the value of the requested flight level (37,000 feet for this example).

The altitude (or flight level) scale 420 may include alphanumeric indicia of altitude values in any convenient scale (in FIG. 8, the altitude scale 420 includes numerical values expressed in hundreds of feet, in increments of one thousand feet). In this embodiment, the altitude scale 420 is rendered as a scrollable tape such that the host aircraft 424 is always rendered at the same vertical position on the ITP display screen 400. At the time depicted in FIG. 8, the current flight level of the host aircraft 424 is 35,000 feet. The lateral distance scale 422 may include alphanumeric indicia of distance values in any convenient scale (in FIG. 8, the lateral distance scale 422 includes numerical values that represent ITP distance relative to the host aircraft 424, in increments of ten nautical miles). In this embodiment, the lateral distance scale 422 has a zero reference point that corresponds to the current position of the host aircraft. In other words, the graphical representation of the host aircraft 424 is aligned with the zero lateral distance mark on the lateral distance scale 422. Consequently, the host aircraft 424 and the lateral distance scale 422 are rendered in fixed positions on the ITP display screen 400. In contrast, during operation, the altitude scale 420, the non-reference neighboring aircraft 426, the reference aircraft 428 and 430, the opportunity region 432, the timing marker 434, and the requested flight level marker 436 can be rendered in a dynamic manner that reflects the changing flight conditions and aircraft positions.

In certain embodiments, the user can move the flight level marker 436 up or down by activating the first user-selectable adjustment button 410 (up) or the second user-selectable adjustment button 412 (down). In an exemplary implementation, the flight level marker 436 moves up by one flight level (as indicated by the altitude scale 420) for each activation of the first user-selectable adjustment button 410. Conversely, the flight level marker 436 moves down by one flight level for each activation of the second user-selectable adjustment button 412.

Notably, the graphical representations of the host aircraft 424, the neighboring aircraft 426, and the reference aircraft 428/430 are positioned in the main display area 402 in accordance with the current flight status data of the host aircraft and in accordance with the current flight data of the other aircraft (which may be received by the host aircraft using, for example, ADS-B technology). The graphical representations of the neighboring aircraft 426 and the reference aircraft 428/430 are positioned on the main display area 402 in a manner that indicates the actual respective altitudes of the other aircraft relative to the host aircraft, and in a manner that indicates the actual ITP distance between the other aircraft and the host aircraft. Consequently, the current ITP distance and vertical distance between the host aircraft and the nearby aircraft can be quickly and easily determined from the ITP display screen 400.

In certain embodiments, the main display area 402 includes graphical identifiers or labels for the displayed aircraft. For this particular example, all displayed aircraft (other than the host aircraft 424) are rendered with their corresponding alphanumeric carrier and tail identifiers. Thus, the neighboring aircraft 426 is rendered with the text "MAH 714", the reference aircraft 428 is rendered with the text "LTU 401", and the reference aircraft 430 is rendered with the text "DAL 818". The airline flight number may also be used to identify the displayed aircraft. In particular embodiments, the main display area 402 also includes graphical indicia of certain flight status information for reference aircraft. For example, a reference aircraft could be rendered with text that indicates its current ITP distance relative to the host aircraft. As another example, a reference aircraft could be rendered with text that indicates its airspeed relative to the host aircraft. In this regard, the reference aircraft 428 is rendered with the additional information "18 NM 10 KT" (which indicates an ITP distance of 18 nautical miles and a relative speed of ten knots), and the reference aircraft 430 is rendered with the additional information "13 NM 10 KT". As another example, separation indicators 438 (rendered as small triangles in FIG. 8) could be displayed near their respective reference aircraft. A separation indicator graphically indicates whether the gap between the host aircraft and the respective reference aircraft is getting smaller (closing) or larger (separating). For the illustrated embodiment, the separation indicator 438 points toward the host aircraft 424 when the distance is closing, and points away from the host aircraft 424 when the distance is separating. As an additional visual cue, a solid separation indicator 438 indicates that the gap is closing, and a hollow or outlined separation indicator 438 indicates that the gap is separating.

The opportunity region 432 visually indicates when the host aircraft will be able to request an ITP flight level change (while remaining compliant with the governing ITP). Accordingly, the opportunity region 432 graphically indicates a zone for which the ITP criteria (or other stated conditions) will be satisfied. For this example, the opportunity region 432 represents an estimate or prediction of a future time period during which the ITP criteria will be satisfied, since query task 314 (see FIG. 7) has determined that the criteria has not yet been satisfied. In certain embodiments, the opportunity region 432 is displayed on, overlapping, or near the lateral distance scale 422. Rendering the opportunity region 432 in this manner is desirable because the horizontal dimension of the opportunity region 432 follows the scale used for the lateral distance scale 422 (e.g., ITP distance).

The opportunity region 432 may be rendered using certain visually distinguishable characteristics to make it more noticeable or prominent in the main display area 402. For example, the opportunity region 432 could be rendered in a visually distinguishable manner, relative to the lateral distance scale 422, relative to the horizontal altitude reference lines, relative to the displayed aircraft, etc. In this regard, the different visually distinguishable characteristics may correspond to any of the following characteristics, individually or in any combination thereof: different colors; different brightness; different transparency levels; different translucency levels; different line patterns; different line thickness; different shapes; different sizes; different flicker patterns; different focus levels; different sharpness levels; different clarity levels; and different contrast levels. In preferred embodiments, for example, the graphical representation of the opportunity region 432 is rendered in a color (such as bright green) that is easily distinguishable from other color schemes that might be used for other items in the main display area 402.

For this particular embodiment, if the stated criteria is not satisfied, then the ITP display screen 400 is rendered such that no portion of the host aircraft 424 is displayed in contact with, overlapping, superimposed with, or in the opportunity region 432. In other words, the host aircraft 424 is separated from and does not touch the opportunity region 432. This separation provides a visual indication that the stated conditions (needed in order to request the flight level change) have not been met. Although not always required, the "gap" between the host aircraft 424 and the opportunity region 432 could be used to render the timing marker 434, as shown in FIG. 8. The timing marker 434 graphically indicates the estimated time to reach satisfaction of the ITP criteria (which was calculated during task 316 of the process 300). In this regard, the timing marker 434 may be rendered with text that indicates the estimated time. For this example, the timing marker 434 includes the text "20 MIN", which indicates that the host aircraft should satisfy the ITP conditions for the requested flight level in approximately twenty minutes (assuming that the current flight conditions do not change significantly).

The host aircraft 424, the neighboring aircraft 426, and the reference aircraft 428/430 could be rendered using certain visually distinguishable characteristics if so desired. Any of the different visually distinguishable characteristics listed above with reference to the opportunity region 432 could be utilized to render the aircraft in a variable manner. For example, it may be desirable to render the displayed aircraft in a particular manner that conveys the current ITP status, the relative ITP distance, the respective flight status of the aircraft, or the like. In this regard, the reference aircraft are rendered using a first color and/or shading scheme, while other traffic is rendered using a second color and/or shading scheme. The use of different colors and/or shading allow the reference aircraft to be highlighted and easily identifiable on the display. As a further enhancement, it may be desirable to use one color and/or shading scheme for reference aircraft when the ITP distance is closing, and a different color and/or shading scheme for reference aircraft when the ITP distance is separating.

Referring back to FIG. 7, if it is time to refresh the ITP display (query task 320), then the process 300 returns to task 302 to obtain updated data and refresh the ITP display in response to the updated data. Thus, the content of the ITP display is dynamically updated as the host aircraft continues its flight path. Notably, the size of the opportunity region 432 and the size of the timing marker 434 can change over time to reflect the current conditions and to indicate whether the ITP criteria is satisfied at any given moment. As mentioned previously, the ITP display screen 400 depicted in FIG. 8 corresponds to a time when the ITP criteria is not satisfied. If, however, query task 314 determines that the criteria is satisfied, then process 300 will generate and render an appropriate ITP display on the onboard display element of the host aircraft (task 322). The ITP display will include many of the graphical features, visual elements, and graphical representations described above for the ITP display screen 400, and common items will not be redundantly described in detail here.

Figure 9:
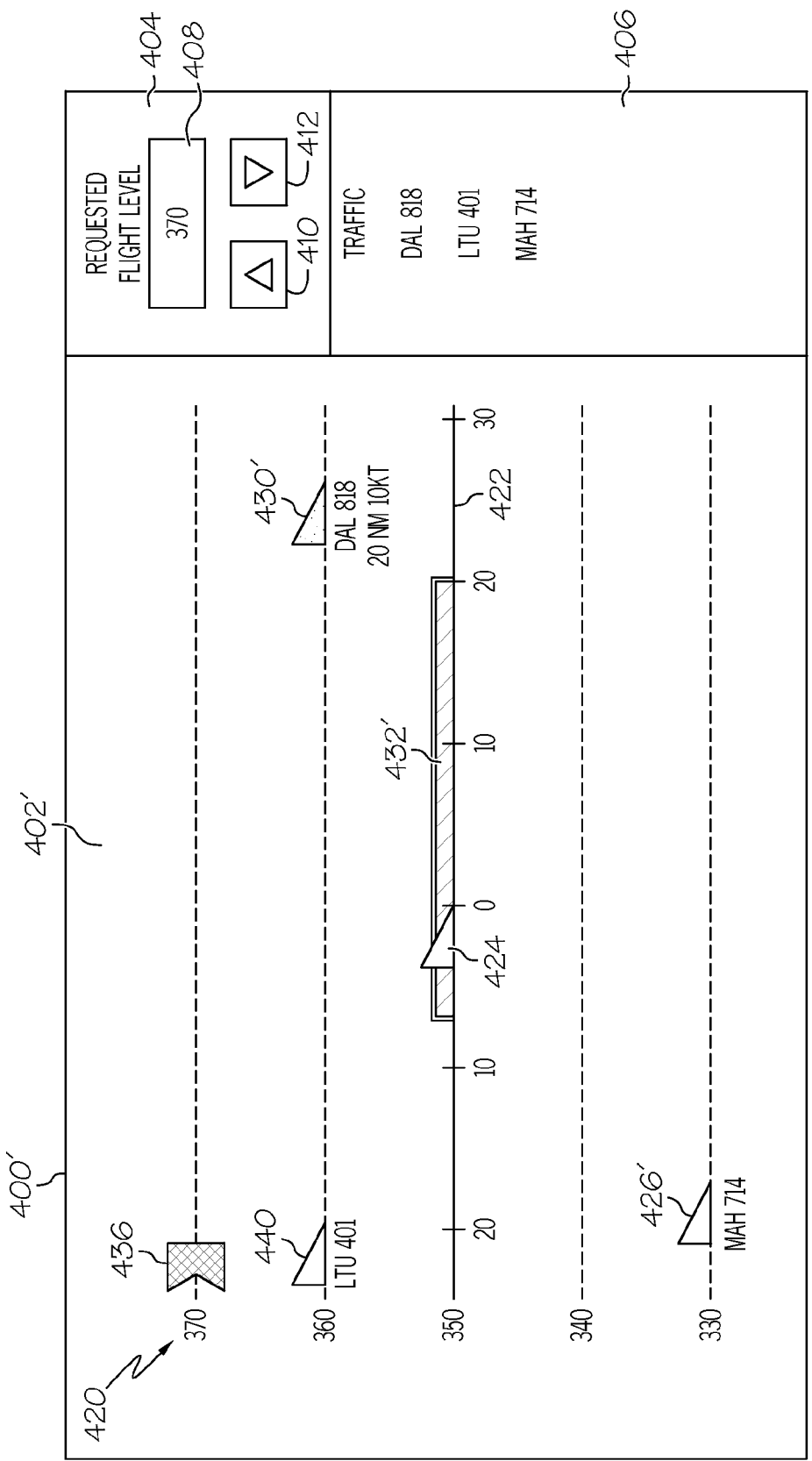

FIG. 9 is a schematic representation of the ITP display screen 400', which might be generated during an iteration of task 322. The ITP display screen 400' represents an updated version of the ITP display screen 400 (the prime number notation indicates updated status). For this example, the LTU 401 aircraft is no longer considered to be a reference aircraft for ITP purposes. Rather, the LTU 401 aircraft is now treated as an "out of range" neighboring aircraft 440. Accordingly, this neighboring aircraft 440 is now rendered without any ITP distance or speed information, and it is rendered using the same visual characteristics as the other neighboring aircraft 426'. In contrast, the DAL 818 aircraft remains a reference aircraft for ITP purposes. Accordingly, this reference aircraft 430' is still rendered with its ITP distance and speed information. In alternate embodiments, the ITP distance and speed information remains displayed for all traffic that appears on the display.

At the time corresponding to FIG. 9, the opportunity region 432' visually indicates that the ITP criteria has been satisfied for the requested new flight level. Accordingly, the main display area 402' no longer includes a timing marker. For this particular embodiment, the ITP display screen 400' is rendered such that at least a portion of the host aircraft 424 is displayed in contact with, overlapping, superimposed with, or in the opportunity region 432'. In other words, the host aircraft 424 is no longer separated from the opportunity region 432'. In FIG. 9, the entire graphical representation of the host aircraft 424 resides in the opportunity region 432'. This visually indicates that the host aircraft is able to request the desired flight level change at the present time and for a period of time in the future.

Referring again to FIG. 7, if it is time to refresh the ITP display (query task 320), then the process 300 returns to task 302 to obtain updated data and refresh the ITP display in response to the updated data. Thus, the content of the ITP display is dynamically updated as the host aircraft continues its flight path.

For simplicity and ease of description, FIG. 8 and FIG. 9 only depict one opportunity region rendered with the ITP display. In practice, multiple opportunity regions could be displayed concurrently. For instance, there could be one opportunity region displayed behind a leading reference aircraft, and another opportunity region displayed in front of that leading reference aircraft. As another example, there could be one rendered opportunity region corresponding to a leading reference aircraft, and another rendered opportunity region corresponding to a trailing reference aircraft.

The graphical opportunity region enables the pilot and flight crew to quickly and easily determine whether or not the ITP criteria has been satisfied for a desired ITP flight level change. If the graphical representation of the host aircraft is not touching or overlapping the opportunity region, then the pilot need not waste any time or effort trying to send an ITP request. On the other hand, if the graphical representation of the host aircraft is touching or overlapping the opportunity region, then the pilot can initiate an ITP request with confidence that the ITP criteria is satisfied. An ITP request may thereafter be handled in an appropriate manner, which may follow conventional and well-known protocols. For example, the host aircraft may issue the ITP request using radio communication or the ATC datalink system, and then wait for ITP clearance or authorization from ATC. If the host aircraft receives ATC clearance for the ITP, then the host aircraft can proceed by climbing or descending to the requested flight level.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for displaying aircraft traffic information on an onboard display element of a host aircraft, the method comprising:
    obtaining current flight status data of the host aircraft and current flight status data of a second aircraft that is near the host aircraft via an aircraft-to-aircraft communication module;
    a processor which processes the current flight status data of the host aircraft and the current flight status data of the second aircraft to determine an in-trail procedure (ITP) opportunity region for the host aircraft, the ITP opportunity region being associated with conditions that satisfy ITP criteria for the host aircraft;
    rendering, on the onboard display element, an ITP display comprising graphical representations of the host aircraft and the second aircraft positioned in accordance with the current flight status data of the host aircraft and the current flight status data of the second aircraft, and the ITP display further comprising a graphical representation of the ITP opportunity region; and
    wherein the processor further analyzes the current flight status data of the host aircraft and the current flight status data of the second aircraft to determine whether the ITP criteria has been satisfied;
    wherein the ITP display is rendered such that at least a portion of the graphical representation of the host aircraft is displayed in contact with or in the graphical representation of the ITP opportunity region when the ITP criteria is satisfied; and
    wherein the ITP display is rendered such that no portion of the graphical representation of the host aircraft is displayed in contact with or in the graphical representation of the ITP opportunity region when the ITP criteria is not satisfied.

2. The method of claim 1, the ITP display further comprising an altitude scale for the host aircraft and the second aircraft.

3. The method of claim 1, the ITP display further comprising a lateral distance scale for the host aircraft and the second aircraft.

4. The method of claim 3, the lateral distance scale being expressed in ITP distance.

5. The method of claim 1, wherein obtaining the current flight status data of the second aircraft comprises receiving the current flight status data of the second aircraft directly from the second aircraft using aircraft-to-aircraft data communication.

6. The method of claim 1, further comprising acquiring a requested flight level that is different than a current flight level of the host aircraft, wherein determination of the ITP opportunity region is influenced by the requested flight level.

7. The method of claim 1, further comprising calculating, from the current flight status data of the host aircraft and the current flight status data of the second aircraft, an estimated time to reach ITP criteria satisfaction for the host aircraft, wherein the ITP display further comprises a graphical representation of a timing marker that indicates the estimated time.

8. A method for displaying aircraft traffic information on an onboard display element of a host aircraft, the method comprising:
- receiving, from a reference aircraft other than the host aircraft, current flight status data of the reference aircraft via an aircraft-to-aircraft communication module;
- acquiring a requested flight level that is different than a current flight level of the host aircraft;
- a processor which determines an opportunity region for the host aircraft, the opportunity region being associated with conditions required to request a change in flight level from the current flight level of the host aircraft to the requested flight level, the opportunity region being determined based on the current flight data of the reference aircraft, the requested flight level, the current flight level, and current flight data of the host aircraft;
- displaying a graphical representation of the opportunity region on the onboard display element; and
- wherein the processor further analyzes current flight status data of the host aircraft and the current flight status data of the reference aircraft to determine whether the conditions have been satisfied;
- wherein the graphical representation of the opportunity region is displayed such that at least a portion of the graphical representation of the host aircraft is in contact with or in the graphical representation of the opportunity region when the conditions have been satisfied; and
- wherein the graphical representation of the opportunity region is displayed such that no portion of the graphical representation of the host aircraft is in contact with or in the graphical representation of the opportunity region when the conditions have not been satisfied.

9. The method of claim 8, the opportunity region being determined based on a measure of distance between the host aircraft and the reference aircraft.

10. The method of claim 8, the opportunity region being determined based on a groundspeed differential between the host aircraft and the reference aircraft.

11. The method of claim 8, further comprising displaying, on the onboard display element, a graphical representation of the host aircraft at a first position on a lateral distance scale of in-trail procedure (ITP) distance, wherein the graphical representation of the opportunity region is displayed on the lateral distance scale.

12. The method of claim 11, further comprising displaying, on the onboard display element, a graphical representation of the reference aircraft at a second position that is different than the first position.

13. A flight deck display system for a host aircraft, the system comprising:
- an aircraft-to-aircraft data communication module that receives current flight status data of a second aircraft;
- a processor coupled to the aircraft-to-aircraft data communication module, the processor being configured to obtain and process the current flight status data along with current host aircraft flight status data to determine an opportunity region for the host aircraft, the opportunity region being associated with criteria that must be satisfied to request a change in flight level from a current flight level of the host aircraft to a new flight level, and the processor being configured to generate image rendering display commands based upon the current flight status data, the current host aircraft flight status data, the current flight level, and the new flight level; and
- a display element coupled to the processor and configured to receive the image rendering display commands and, in response thereto, to render an in-trail procedure (ITP) display that includes graphical representations of the host aircraft, the second aircraft, and the opportunity region;
- wherein the processor is further configured to analyze current flight status data of the host aircraft and the current flight status data of the second aircraft to determine whether the criteria has been satisfied;
- wherein the graphical representation of the opportunity region is rendered such that at least a portion of the graphical representation of the host aircraft is in contact with or in the graphical representation of the opportunity region when the criteria has been satisfied; and
- wherein the graphical representation of the opportunity region is rendered such that no portion of the graphical representation of the host aircraft is in contact with or in the graphical representation of the opportunity region when the criteria has not been satisfied.

14. The system of claim 13, wherein the criteria comprises ITP criteria associated with a measure of distance between the host aircraft and the second aircraft.

15. The system of claim 13, wherein the criteria comprises ITP criteria associated with a groundspeed differential between the host aircraft and the second aircraft.

16. The system of claim 13, wherein:
- the processor calculates an estimated time to reach satisfaction of the criteria, from the current flight status data, the current host aircraft flight status data, the current flight level, and the new flight level; and
- the ITP display includes a graphical representation of a timing marker that indicates the estimated time.

* * * * *